UNITED STATES PATENT OFFICE.

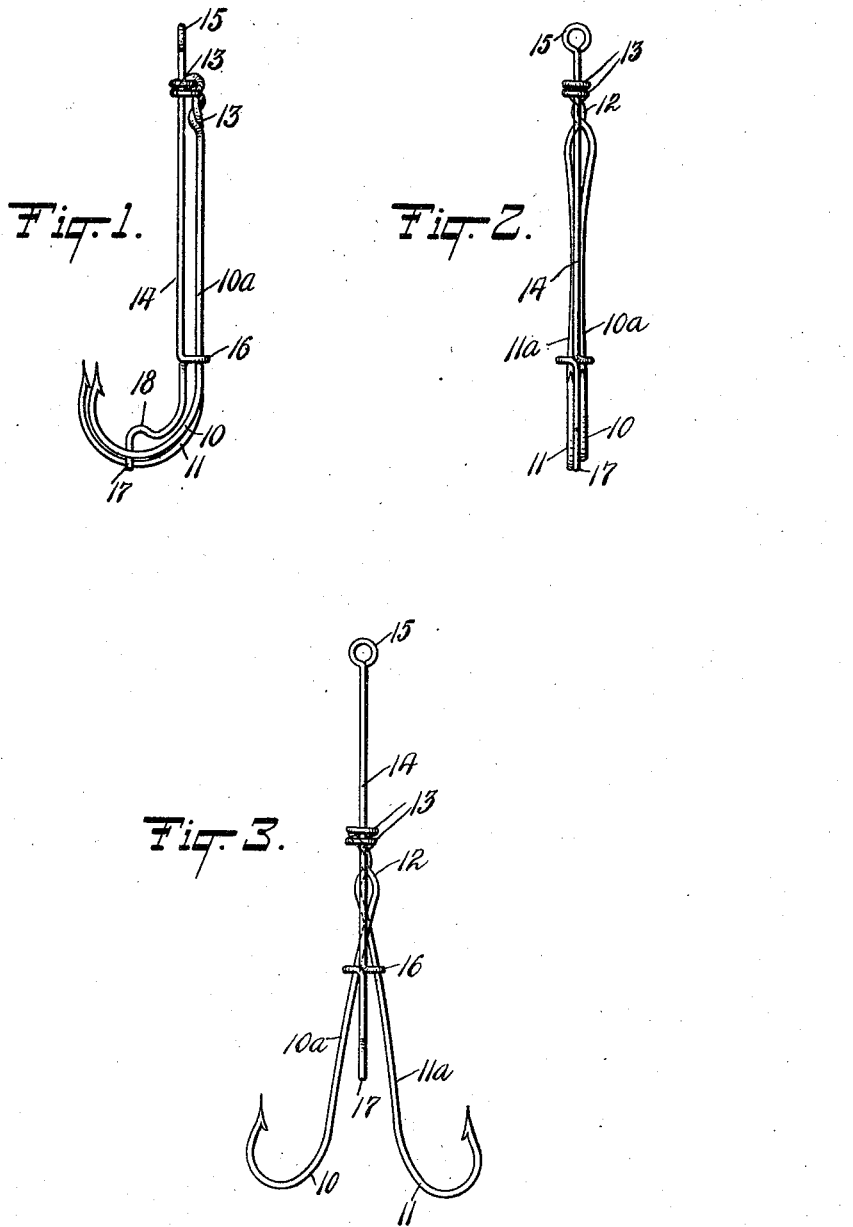

LOUIS JOHN ENGLUND, OF MARSHFIELD, OREGON.

FISH-HOOK.

1,066,392.

Specification of Letters Patent.　　Patented July 1, 1913.

Application filed November 5, 1912.　Serial No. 729,562.

*To all whom it may concern:*

Be it known that I, LOUIS J. ENGLUND, a citizen of the United States, and a resident of Marshfield, in the county of Coos and State of Oregon, have invented a new and Improved Fish-Hook, of which the following is a full, clear, and exact description.

My invention relates to the class of fishing devices comprising a plurality of hooks having means for retaining them in close relation, and adapted to be released and to spring apart when the bait carried thereby is taken hold of by the fish.

It is a design of my invention to provide a device of the indicated character, of simple construction, and positive in its action.

It is a further design of the invention to provide for the expansion of the hooks under torsional action inherent in the combined shanks thereof, and to utilize this torsional spring pressure of the hooks as exerted against a controlling device to hold the hooks in the closed position to be automatically released.

The distinguishing features of my invention and the important structural elements characterizing the preferred embodiment which is illustrated as an example, will be more particularly explained in the specific description hereinafter to be given.

Reference is to be had to the accompanying drawings forming a part of this specification, in which similar characters of reference indicate corresponding parts in all the views.

Figure 1 is a side elevation of a fishing device embodying my invention, showing the hooks in the closed position; Fig. 2 is a front elevation thereof, with the hooks in the closed position; and Fig. 3 is a front elevation showing the hooks released and sprung apart.

In carrying out my invention a pair of hooks 10, 11, is provided, the shanks $10^a$, $11^a$ of which are preferably formed from a single wire or rod bent upon itself, the shanks being so bent and twisted as to put them under torsional spring tension. Thus a twist is given to the shanks at their upper ends, as at 12, and the material forming the shanks is then bent to form a pair of alining eyes 13 at the terminals of the shanks, the arrangement being such that the hooks have a tendency to spring apart under the tension of the torsional strain, from the position shown in Figs. 1 and 2, to that illustrated in Fig. 3. The eyes 13 loosely embrace the shank 14 of a controlling device for the hooks, said shank terminating at its upper end in an eye 15 or equivalent element for connecting the device with a fish line (not shown). Between the upper and lower ends the shank 14 is bent to form an eye 16 that loosely embraces the shanks $10^a$, $11^a$, of the hooks, so that the said hooks have guided longitudinal sliding movement relatively to the controlling device. Said controlling device below the guide eye 16 is provided with a downwardly projecting finger 17, which is produced preferably by giving the controlling device a slight upward bend as at 18, which merges into the downwardly-projecting finger 17.

The one hook 10, it will be observed, is given lesser dimensions in certain particulars than the companion hook 11, and the hooks are adapted to be turned toward each other against the torsional spring tension of their shanks, and to move inward toward each other and slightly past each other, their paths of movement thus slightly overlapping, and owing to the relative longitudinally sliding movement of the controlling device and its finger 17, said finger is adapted to intersect the overlapped paths of the hooks and enter between the hooks, as illustrated in Figs. 1 and 2. In this position it is obvious that the hooks normally tending to assume the spread-apart position of Fig. 3 from that shown in Fig. 2, will frictionally engage opposite sides of the finger 17, and said finger will hold the hooks from spreading and maintain them in close relation, as in Figs. 1 and 2. Upon a fish taking a bait or lure on the hooks, the pull of the fish will slide the hooks relatively to the controlling device and release the hooks from the finger 17, thus permitting the hooks to spring apart under their torsional tension.

Having thus described my invention, I claim as new and desire to secure by Letters Patent,—

A fishing device, comprising a pair of fish-hooks provided with shanks, one of the hooks being of less size than the other and the shanks of said hooks having means to exert torsional spring tension thereon, the hooks being movable against the torsional spring tension in overlapping paths, and a controlling device having a shank on which the shanks of the hooks have sliding movement, the controlling device terminating in a downwardly projecting finger adapted to enter between the hooks after they have been moved to the overlapped paths.

In testimony whereof I have signed my name to this specification in the presence of two subscribing witnesses.

LOUIS JOHN ENGLUND.

Witnesses:
J. W. WATT,
CHAS. STAUFF.

Copies of this patent may be obtained for five cents each, by addressing the "Commissioner of Patents. Washington, D. C."